United States Patent
Griffiths

(10) Patent No.: US 7,431,569 B2
(45) Date of Patent: Oct. 7, 2008

(54) PUMP HEALTH MONITORING

(75) Inventor: Michael Griffiths, Bromsgrove (GB)

(73) Assignee: Goodrich Control Systems Limited (GB)

( * ) Notice: Subject to any disclaimer, the term of this patent is extended or adjusted under 35 U.S.C. 154(b) by 837 days.

(21) Appl. No.: 10/963,424

(22) Filed: Oct. 12, 2004

(65) Prior Publication Data

US 2005/0111988 A1    May 26, 2005

(30) Foreign Application Priority Data

Oct. 11, 2003    (GB)    ................................. 0323887.0

(51) Int. Cl.
F04B 43/12    (2006.01)
G01M 3/02    (2006.01)
F02G 3/00    (2006.01)

(52) U.S. Cl. ................................. 417/53; 417/63; 73/37; 60/39.091; 60/39.281

(58) Field of Classification Search .................... 417/53, 417/63; 73/1.16, 37, 40; 60/39.281, 39.091
See application file for complete search history.

(56) References Cited

U.S. PATENT DOCUMENTS 4,129,037 A * 12/1978 Toalson .................... 73/152.61
4,705,459 A    11/1987 Buisine et al.
5,112,196 A *  5/1992 Schuh ........................ 417/63
7,204,076 B2 * 4/2007 Griffiths et al. .......... 60/39.281

FOREIGN PATENT DOCUMENTS

AT    386 483       8/1988
GB    2 314 412    12/1997
JP    2000205141    7/2000

* cited by examiner

Primary Examiner—Charles G Freay
(74) Attorney, Agent, or Firm—Andrus, Sceales, Starke & Sawall, LLP

(57) ABSTRACT

A method of monitoring the health of a positive displacement hydraulic pump comprising the steps of:
  establishing a flow path having a known flow number between a high pressure outlet line of the pump (and a low pressure line of the system;
  progressively changing the speed of operation of the pump; and,
  noting the speed of operation of the pump at a parameter responsive to the output pressure of the pump changes in response to said change in rotational speed of the pump.

10 Claims, 2 Drawing Sheets

PUMP HEALTH MONITORING

TECHNICAL FIELD

This invention relates to a method of monitoring the health of a pump in a fuel supply system, conveniently but not exclusively, a fuel supply system for a gas turbine engine of an aircraft.

Although the invention may find application outside of the field of aircraft gas turbine engine fuel supply systems, the problem which the invention solves, and an understanding of the invention can best be appreciated by describing the invention in relation to an aircraft engine fuel supply system.

BACKGROUND ART

In an aircraft gas turbine engine fuel supply system it is common to use a positive displacement pump such as a gear pump or a piston pump to provide fuel at high pressure for supply, through a fuel metering unit (FMU), to the burners of the gas turbine engine. Positive displacement pumps all have an individual internal leakage characteristic in that some proportion of the high pressure output flow of the pump leaks back to the low pressure inlet side of the pump by way of internal leakage flow paths in the pump. Such leakage becomes progressively worse with time as a result of wear of the internal components of the pump. Clearly pumps will wear at different rates dependent upon their usage and the ambient conditions in which they operate. Eventually a point is reached in the service life of every pump at which the leakage is sufficient to prevent the pump being able to deliver either the flow required to start the associated engine at low engine/pump speeds, or provide the flow required for aircraft take-off at maximum engine/pump speed.

Since the rate at which a pump wears is dependant upon its operational parameters it is extremely desirable to be able to monitor the health of the pump in use, that is to say to monitor its leakage characteristic, during service, in order to allow pumps to be taken out of service at the optimum time in relation to the life of the pump rather than at fixed maintenance intervals. Thus a pump could be replaced when its monitored health indicates that a failure may be imminent rather than replacing the pump at a fixed and pre-determined time. Naturally pumps which are exhibiting less wear can remain in service longer.

It will be recognised that, ignoring leakage in the pump, the output flow of a positive displacement pump is proportional to its rotation speed. Generally, positive displacement pumps in aircraft engine fuel supply systems are driven from an engine accessory gear box so that the pump speed is directly proportional to the speed of the associated engine.

In the specification the term "flow number" is used. It is believed that the term is well understood in the art, but for the avoidance of doubt a flow number of an orifice, or flow path, is a measure of the flow restriction which that orifice or path presents at a given hydraulic pressure drop across the orifice or flow path. The flow number of an orifice or flow path is calculated by dividing the flow through the orifice or other flow path by the square root of the pressure difference across the orifice or flow path.

DISCLOSURE OF THE INVENTION

In accordance with the present invention there is provided a method of monitoring the health of a positive displacement hydraulic pump, comprising the steps of, establishing a flow path having a known flow number between a high pressure outlet line of the pump and a low pressure line of the system;

progressively changing the speed of operation of the pump; and, noting the speed of operation of the pump at which a parameter responsive to the output pressure of the pump changes in response to said change in rotational speed of the pump.

In a positive displacement pump the output flow of the pump is directly related to its rotational speed. In an engine fuel system, with the flow to the engine shut-off, all the pump output flow is returned to pump inlet via a number of restrictions including that constituted by the internal pump leakage path. The pressure rise generated across the pump is therefore a function of the pump speed (hence flow) and the total restriction between the pump outlet and pump inlet. At a given speed and flow, a certain pressure rise will be generated sufficient to move a member (or allow a member to be moved) the member being responsive to pump delivery pressure. The speed (flow) at which this pressure is achieved will vary with the size of the pump leakage. Recording the speed at which a responsive member moves and knowing the pump pressure rise at the point of movement, and the flow numbers of all restrictions except pump leakage, allows the pump leakage flow number to be computed.

Preferably the change in speed of operation of the pump is an increase in the speed of operation of the pump from a stationary condition of the pump.

Alternatively said change in pump speed is a decrease in speed from a normal operational speed.

Preferably the parameter responsive to the output of the pump is the movement of the movable metering member of a metering valve of the FMU of the fuel supply system.

Alternatively said parameter is the electrical current flowing in an electrical actuator associated with movement of a movable metering member of a metering valve of the FMU.

Desirably movement of the movable member of the metering valve is monitored by a sensor, conveniently an LVDT, provided in association with the metering valve for other purposes.

Desirably the fuel system includes an electronic engine controller which is arranged to recognise, inter alia, the change in said parameter and to utilise the engine/pump speed at the time of the parameter change to compute the leakage flow number of the pump during a start-up or run-down sequence of operation of the engine.

Conveniently the fuel temperature is determined and fuel temperature variation is accommodated in the determination of pump health.

BRIEF DESCRIPTION OF THE DRAWINGS

One example of the invention will now be described with reference to the accompanying drawings in which.

PREFERRED MODE OF CARRYING OUT THE INVENTION

Figure 1:
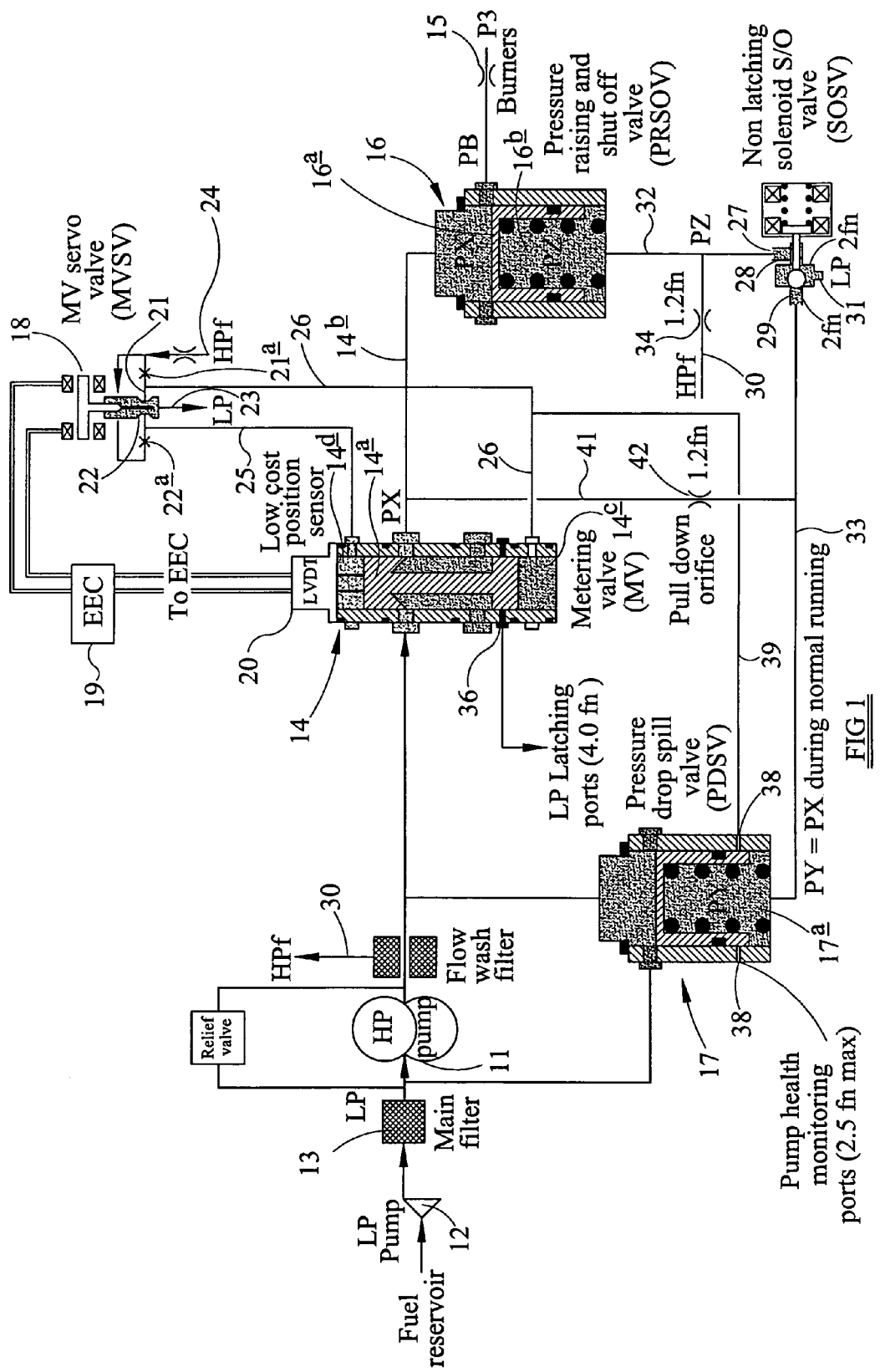
FIG. 1 is a schematic hydraulic circuit diagram of an aircraft gas turbine engine fuel supply system, and, FIG. 2 is graph showing the effect of pump leakage flow number on the engine/pump speed at which a responsive member of system will move, that is the speed at which the critical value of pump pressure rise is reached.

In FIG. 1 it can be seen that a high pressure positive displacement pump 11, conveniently a gear pump, is supplied with fuel from a reservoir by a low pressure pump 12 through a main fuel flow filter 13. A fuel metering unit (FMU) including a fuel metering valve 14 controls flow of fuel from the high pressure output side of the pump 11 to the burners 15 of the gas turbine engine, the FMU also including a Pressure Raising and Shut Off Valve (PRSOV) 16, and a Pressure Drop Spill Valve (PDSV) 17 which can route high pressure output from the pump 11 back to the low pressure inlet of the pump 11 as necessary.

In general terms the system described so far is conventional. An electrically operated metering valve servo valve 18 controls operation of the valve 14 in response to control signals from an electronic engine controller (EEC) 19 which receives electronic data representative inter alia of the position of the metering member 14a of the valve 14 and the speed of operation of the associated engine. The pump 11 is driven directly by the engine through a gear box, and so the speed of operation of the pump and its output flow is thus directly related to the speed of operation of the engine.

During normal operation of the system the PDSV 17 maintains a constant pressure drop across the metering orifice of the metering valve 14 and the PRSOV 16 ensures that the hydraulic pressure upstream of the valve 14 does not drop below an acceptable minimum pressure at which the system can operate. However, in known manner the PRSOV can also be operated to isolate the burners 15 from the output of the metering valve 14 and so shutdown operation of the associated engine.

The metering valve servo valve 18 is a conventional torque motor operated flapper valve having first and second opposed return ports 21 and 22 and a common outlet port 23 connected to a low pressure line of the system. It is convenient to think of the low pressure line as a drain line through which fuel flows back to the inlet side of the gear pump 11, the low pressure line usually being at a pressure above atmospheric pressure, but significantly below the normal high outlet pressure of the pump 11. Fuel at high pressure is supplied through a line 24, from the output side of the pump 11, to both of the ports 21 and 22 of the valve 18 through respective restrictors 21a, 22a. Moreover, the port 22 is connected through a line 25 to a pressure chamber 14d within the valve 14 at the upper end of the metering member 14a while the port 21 is connected through a line 26 to a pressure chamber 14c of the valve 14 at the lower end of the member 14a.

The PRSOV 16 has a movable metering member 16a spring urged to a position in which it isolates the engine burners 15 from the output of the metering valve 14. The action of the spring on the member 16a is opposed by fuel pressure from the outlet side of the metering valve 14 acting on the top face of the member 16a, but the spring action is assisted by fuel pressure in a chamber 16b of the valve 16 beneath the member 16a.

A non-latching Solenoid Shut Off Valve (SOSV) 27 under the control of the EEC 19 has first and second inlets 28, 29 and an outlet 31. The outlet 31 is permanently connected to the low pressure line of the system, and the valve 27 is movable between a first position in which inlet 28 is open so that a line 32 from the chamber 16b of the valve 16 is connected to the outlet 31 and the inlet 29 is closed, and a second position in which the inlet 28 is closed and the inlet 29 is open so that a line 33 connected at one end to the inlet 29 and its other end of a pressure chamber 17a of the valve 17 is connected through the valve 27 to the low pressure line 31.

During normal operation of the system described above the valve 27 will be in its first position so that the chamber 16b of the valve 16 is vented to the low pressure line of the system, and the member 16a of the valve 16 will be moved by an appropriate output pressure from the pump 11, to connect the burners 15 with the metering valve 14. A high pressure line 30 taking fuel from the outlet of the pump 11 through a flow wash filter is connected through a restrictor 34 to the line 32 and in the event that shut down of the engine is required then the valve 27 is moved to its second position so that the line 32 is no longer drained to the low pressure line of the system and high pressure through the restrictor 34 is supplied to the line 32 and the chamber 16b to drive the member 16a upwardly to isolate the burners 15 from the metering valve 14 and so shut-down the engine.

Assuming that the valve 16 is open, the position of the metering member 14a of the valve 14 is controlled by the valve 18 in response to signals received from the EEC 19. When the EEC recognises that acceleration of the engine is needed it commands the valve 18 to move to restrict the return port 21 and open the return port 22 resulting in a net flow into metering valve pressure chamber 14c and out of chamber 14d. The pressure change in chamber 14c and 14d displaces the valve metering member 14a in a direction to increase the fuel flow to the burners 15 through the output line 14b of the metering valve and the valve 16. The EEC 19 receives signals representative of the physical position of the metering member 14a of the valve 14 by means of a LVDT or equivalent position sensor 20 associated with the valve 14. An increase in fuel to the engine burners 15 causes an increase in operational speed of the engine and thus an increase in the operational speed of the pump 11 with a consequential increase in the output flow from the pump 11. The line 33 is connected to the line 14b by a line 41, and the valve 17 is operated, in known manner, to maintain a substantially constant pressure drop across the metering orifice of the valve 14 as the valve 14 operates, by spilling fuel as necessary from the high pressure output of the pump 11 back to the low pressure side of the pump 11.

The Inventor has recognised that in such a system the health of the pump 11 can be monitored during a start-up sequence of operation of the fuel supply system by establishing a specific flow path of known flow number within FMU, and then noting the engine (pump) speed at which a predetermined output pressure change, in this case a pressure rise (pressure difference between pump inlet pressure and pump outlet pressure) is provided by the pump. By appropriately establishing the flow path it is possible to produce an operating condition in which the pump speed at which a predetermined output pressure rise is reached is a measure of the leakage flow number of the pump itself, and thus is a measure of the health of the pump.

In order to achieve a condition in which the rotational speed of the pump at which a predetermined output pressure rise is achieved can be directly related to the leakage flow number of the pump, the system described above is shutdown from the normal running mode shown in FIG. 1 and described above by energising the SOSV 27 to close the inlet 28 and so permit high pressure fuel supplied to the line 32 by way of the restrictor 34 to close the valve 16 so isolating the engine burners 15 from the metering valve 14. Simultaneously the pressure in the chamber 17a of the PDSV 17 is vented to the low pressure line through the valve 27 causing the PDSV 17 to open fully spilling all of the output from the gear pump 11 back to the low pressure side of the pump.

Immediately the PRSOV 16 isolates the burners 15 from the metering valve 14 the metering valve 14 is driven fully closed by the EEC 19 commanding the valve 18 to move to a position in which the inlet port 22 of the valve 18 is closed so that high pressure fuel from the line 24 is supplied through the line 25 to the chamber 14d of the valve 14. Simultaneously the line 26 is connected to the low pressure line of the system through the ports 21 and 23 of the valve 18 venting the metering valve chamber 14c. Immediately the metering member 14a reaches its fully closed position the lower end of the metering member 14a opens latching ports 36 of the metering valve which vent the output line 14b of the valve 14 to low pressure thus venting the pressure chamber of the PRSOV 16 to low pressure and latching the PRSOV 16 closed.

Once the metering valve is fully closed during this shut-down phase it is possible to de-energise the SOSV 27 so that the SOSV 27 returns to its "run" position in which the chamber 16b of the valve 16 is vented to low pressure. This return of the valve 27 to its "run" position does not affect the system which remains shut-down because the latching ports 36 are maintaining the pressure in the line 14b downstream of the metering valve 14 at low pressure. The system can only be re-started by causing the metering valve to move from its fully closed position so that the metering member 14a closes the latching ports 36.

Once the engine has completely shut down, (zero speed) the fuel supply system of FIG. 1 becomes de-pressurised (no output from the pump 11 since the pump 11 is stationery) and the PDSV 17 closes under the action of its control member return spring disconnecting the output side of the pump 11 from the low pressure input side of the pump. For use in this invention the PDSV 17 is provided with ports 38 which can be referred to as pump health monitoring ports and which in the fully closed position of the PDSV are exposed to the chamber 17a of the PDSV.

Ports 38 are connected through a line 39 to the line 26 and during normal operation of the PDSV 17 the ports 38 are closed by the PDSV metering member. However, when the PDSV is in its fully closed position the metering member of the PDSV 17 exposes the ports 38 so that the chamber 17a of the valve 17 and the line 33 connected thereto are connected through the ports 38 and the line 39 to the line 26. It will be recognised that in this position of the components the pressure chamber 14c of the valve 14 is connected through the line 26, the line 39 and the ports 38 to the pressure chamber 17a beneath the metering member of the valve 17. With the components in this condition it is possible to monitor the health of the pump 11 during the next system start sequence as follows:

At the commencement of an engine start operation in which pump health is to be monitored the components are in the positions described above in that the metering valve 14 is latched fully closed so that the output line 14b of the metering valve is vented to low pressure through the latching ports 36. The chamber 14c is vented to low pressure through the line 26, the line 39, the ports 38, the chamber 17a, the line 33, the line 41 which includes a restrictor 42 of known flow number, the line 14b and the latching ports 36 of the metering valve.

At the commencement of the engine start sequence the EEC 19 commands the servo valve 18 to move to a position in which its port 21 is closed. It will be recognised that if this happened during normal engine operation then high pressure fuel supplied from the line 24 through the restrictor 21a and the line 26 would pressurise the chamber beneath the metering member 14a of the valve 14 and would drive the valve to an open position. However, at this stage in the engine start sequence the engine is not rotating, and so the pump 11 is still stationary and there is no pump output. Furthermore, as described above the pressure chamber 14c is vented to low pressure. Immediately the engine starts to rotate under the action of its starter, the pump 11 which is directly driven through a gear box from the engine also starts to rotate and thus to supply pressurised fuel. The PDSV 17 is closed, and so none of the output of the pump is returned to the low pressure side of the pump through the PDSV. The metering valve 14 is closed, and so all of the output from the pump 11 flows either through leakage paths in the pump 11 back to low pressure, or through the predetermined path of known flow number comprising the line 24, the restrictor 21a, the line 26, the line 39, the pump health monitoring ports 38, the chamber 17a, the line 33, the line 41 including the restrictor 42, and the metering valve latching ports 36.

Initially, while the engine speed is low the whole of the pump output can be returned to low pressure by leakage in the pump itself, and/or through the path defined immediately above. Thus the metering valve remains closed because insufficient pressure is generated within the chamber 14c to move the metering member 14a even though the valve 18 is in a position commanding the metering valve to open. However, as the engine speed increases the pump delivers more flow and the pressure in the system rises. A point is reached at which the pressure in the chamber above the metering member of the PDSV 17 is sufficient to move the metering member against its return spring in a direction to open the valve 17. Initial movement of the metering member of the valve 17 from its closed position begins to close the pump health monitoring ports 38 and so gradually closes the drain connection from the line 39 to the line 33. Pressure in the line 26 begins to rise and is thus applied to the pressure chamber of the metering valve 14 beneath the metering member 14a. As the ports 38 continue to close a point is reached at which the pressure in the chamber 14c is sufficient to move the valve member 14a off its minimum travel stop.

It will be recalled that movement of the metering member 14a of the valve 14 is monitored by the EEC 19 by way of a position sensor of the valve 14. Thus the EEC 19 can record the engine speed at which the movement of the metering member 14a commences. It should be recognised that the initial movement of the metering member 14a away from its closed position takes place before the metering member of the PDSV 17 has opened the main spill profile of the valve 17. This is important because once the spill profile of the valve 17 has opened there is no way of knowing how far it has opened, and consequently it would not be possible to calculate the proportion of low pressure return flow that is attributable to pump leakage.

Figure 2:
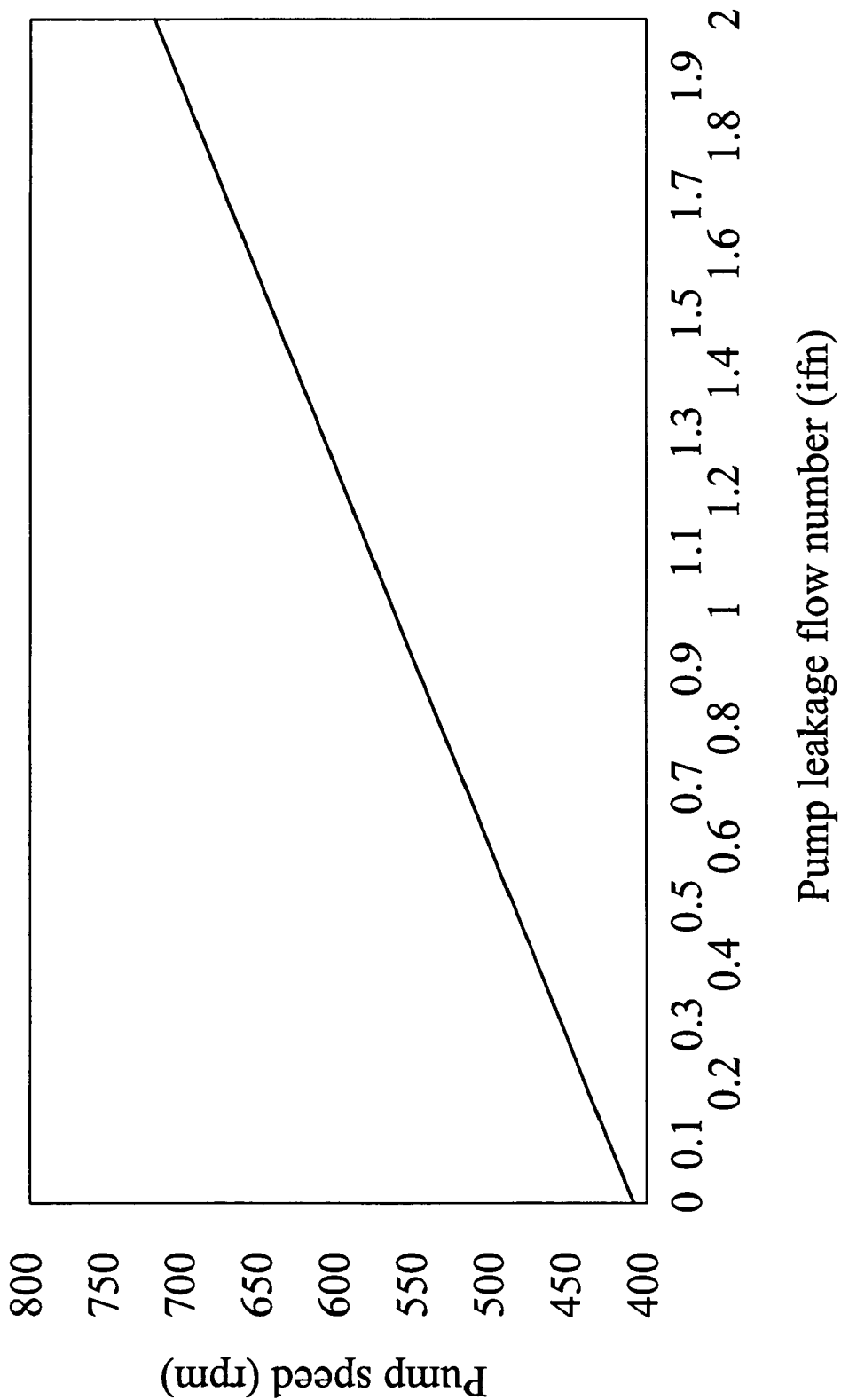

It will be understood that since the total flow number, during the engine starting operation, through the restrictors 21a, 38, 42, and 36 at a given temperature is known, and does not vary, then changes in the engine speed at which the metering valve 14 starts to open, are attributable to changes in the leakage paths within the pump 11 itself. The engine speed at which the PDSV 17 is opened sufficiently to close the ports 38 and so cause movement of the metering member 14a of the pump 14 will depend upon the amount of leakage in the pump itself. The greater the pump leakage the higher will be the speed of the pump (that is to say the pump delivery flow) required before the valve 17 opens to the critical point at which the metering member 14a of the valve 14 starts to move. Assuming that the force required to move the member 14a is constant then the valve 17 position (and therefore the pump pressure rise HP–LP) at which the member 14a moves is unique. Putting this another way, the engine (pump) speed at which the member 14a moves depends upon pump leakage, but movement of the metering member 14a always occurs at the same point of movement of the metering member of the valve 17 (that is to say the same pump pressure rise HP–LP). FIG. 2 shows the effect of pump leakage flow number on the pump speed at which it is possible to move the member 14a during the pump health monitoring check in an engine start operation. The pump leakage flow number can be calculated as follows:

$$fnleak_{pump} = \frac{P_{size} \times Np_{critical} - fnleak_{fmu} \times \sqrt{HP-LP_{critical}}}{\sqrt{HP-LP_{critical}}} \quad [1]$$

where
$fnleak_{pump}$=leakage flow number of gear pump (gph/sqrt(psi))
$Psize$=gear pump capacity (gph/rpm) {a known value}
$NP_{critical}$=pump speed at which MV moves (rpm)
$fnleak_{fmu}$=leakage flow number of fuel metering unit (gph/sqrt(psi) {i.e. a known flow number value of the restrictions 21a, 38, 42 and 36 and associated lines}
$HP-LP_{critical}$=Gear pump pressure rise (psi) at which it is possible for the member 14a of the metering valve to move.

The leakage flow number of the pump during service $fnleak_{pumpworn}$ may be calculated as follows:

$$\frac{(fnleak_{pump\,new}+fnleak_{fmu})}{\sqrt{HP-LP_{critical}}} = P_{size} \times NP_{critical\,new} \quad [2]$$

and $$\frac{(fnleak_{pump\,worn}+fnleak_{fmu})}{\sqrt{HP-LP_{critical}}} = P_{size} \times NP_{critical\,worn} \quad [3]$$

Dividing equation [2] by [3] gives:

$$\frac{fnleak_{pump\ldots new} + fnleak_{fmu}}{fnleak_{pump\ldots worn} + fnleak_{fmu}} = \frac{NP_{critical\cdots new}}{NP_{critical\cdots worn}}$$

Now $fnLeak_{fmu}$ is fixed and known and $fnleak_{pump\,new}$ and $NP_{critical\,new}$ are measured during initial calibration.

Therefore $fnleak_{pump\,worn}$ can be computed.

It should be noted that the above analysis is true at a given fuel temperature. In practice it will be necessary to compensate for variations in fuel temperature. In some fuel systems fuel temperature is measured directly for other fuelling purposes. In systems without a dedicated temperature sensor, fuel temperature may be inferred by other means for example by monitoring the resistance of the metering valve torque motor coil which varies with fuel temperature.

Given that the flow number is inversely proportional to the square root of the fuel density, and the relationship between fuel density and temperature may be stored within the EEC, it follows that the calculated pump leakage may be corrected for temperature variations. This is achieved by modifying equation [1] to include a fuel density term as follows:

$$fnleak_{pumpT} = \frac{Psize \times Np_{critical} - fnleak_{fmu20} \times \sqrt{\frac{\rho_{20}}{\rho_T}} \times \sqrt{HP-LP_{critical}}}{\sqrt{HP-LP_{critical}}}$$

where $fnleak_{fmu20}$ is leakage flow number of the fmu at 20° C.
$\rho_{20}$ is the fuel density at 20° C.
$\rho_T$ is the fuel density at T° C. and
fnleakpumpT is the pump leakage flow number at T° C.

The pump leakage flow number may be corrected to a standard temperature (i.e. 20° C.) for comparison purposes from the equation $$fnleak_{pump20} = fnleak_{pumpT} \times \sqrt{\frac{\rho_T}{\rho_{20}}}$$

The total leakage flow number of the pump and FMU can be monitored if required.

The PDSV 17 is designed so that the ports 38 are fully closed before the main spill profile is opened. This ensures that the system only measures pump/FMU leakage and is not affected by the spill profile being open. It also limits leakage of metered flow from line 14b to LP during normal operation.

The flow number of the leakage path through the pump itself can thus be monitored each time the engine is started permitting the pump to be replaced when it appears that its health has failed to a point and which the pump is unreliable, rather than waiting, perhaps undesirably, until a predetermined service interval is reached, or alternatively replacing the pump earlier than necessary. Moreover, the system described above has the great advantage of making use of existing engine speed and metering valve position sensors which are provided in the fuel supply system, or more particularly in the fuel metering unit of the system, for other purposes.

In the preferred embodiment of this invention as described above the pump health monitoring check is carried out during engine start-up. However, it is to be recognised that it is also possible to carry out the pump health monitoring check at the end of a flight during engine run-down as the engine slowly decelerates after its fuel supply has been interrupted. In order to perform the pump health monitoring check during engine run-down the EEC 19 powers the torque motor of the servo valve 18 to a position in which the valve 18 is commanding the metering valve 14 to remain in a predetermined open position. The EEC 19 maintains the current flow to the torque motor of the valve 18 and thus the commanded open position of the valve 14 as the engine, and therefore the pump 11, gradually decelerates after its fuel supply has been interrupted by closure of the PRSOV 16 under the action of the valve 27. During engine/pump deceleration a point will be reached at which the gradual closure of the PDSV 17 (as a result of the output pressure of the pump dropping) progresses to the point at which the pump health monitoring ports 38 begin to open.

Immediately the ports 38 begin to open the pressure in the chamber 14c of the metering valve 14 will fall towards the pressure of the low pressure line of the system and the corresponding movement of the member 14a of the valve 14 as detected by the associated sensor will cause the EEC 19 to demand a greater restriction of the port 21 of the valve 18 in an attempt to maintain the predetermined position of the member 14a of the valve 14. The EEC does this by increasing the current flow to the torque motor of the valve 18 and thus the EEC can correlate the point at which it requires to increase the current to the valve 18 with the pump rotational speed at that time and the pressure difference across the pump (thus say the difference in pressure between the inlet pressure to the pump and the outlet pressure from the pump) thereby allowing the pump leakage flow number to be calculated as described above.

It will be recognised that although the output signal from the LVDT or other sensor representative of the position of the metering member of the valve 14 triggers the change in current to the torque motor of the flapper valve 18 the movement of the flapper valve in response to an increased current supply to its torque motor initially restores the position of the metering member of the metering valve. However even though the position of the metering member is maintained the current supplied to the torque motor of the valve 18 continues to rise in an attempt to maintain the metering member position. Accordingly it is more reliable to utilise the change in current supplied to the torque motor of the valve 18 as the "health monitoring trigger point" than it is to use the output of the LVDT or equivalent sensor.

In a modification a spring is used to bias the metering member 14a of the valve 14 towards closure with the result that at the point where the pump health monitoring ports 38 open sufficiently, it will no longer be possible to maintain the position of the metering member 14a against the load imposed by the spring and the member 14a will begin to move towards its closed position. In this circumstance the change in LVDT output signal can be used to provide a reliable trigger point for the pump health monitoring to compute the pump leakage number.

The invention claimed is:

1. A method of monitoring the health of a positive displacement hydraulic pump comprising the steps of:
   establishing a flow path having a known flow number between a high pressure outlet line of the pump and a low pressure line of the system;
   progressively changing the rotational speed of operation of the pump; and,
   noting the speed of operation of the pump at which a parameter responsive to the output pressure of the pump changes in response to said change in rotational speed of the pump.

2. A method as claimed in claim 1 wherein said step of changing the speed of operation of the pump comprises increasing the speed of operation of the pump from a stationary condition of the pump.

3. A method as claimed in claim 1 wherein said step of changing the pump speed comprises decreasing the speed from a normal operational speed.

4. A method as claimed in claim 1 including a fuel supply system having a fuel metering unit with a metering valve and wherein the parameter responsive to the output of the pump is the movement of a metering movable member of the metering valve of the fuel metering unit.

5. A method as claimed in claim 1 including a fuel supply system having a fuel metering unit with a metering valve and wherein said parameter is an electrical current flowing in an electrical actuator associated with movement of a movable metering member of the metering valve of the FMU.

6. A method as claimed in claim 4 including the step of monitoring movement of the movable member of the metering valve with a sensor.

7. A method as claimed in claim 5 including the step of providing said sensor in association with the metering valve for other purposes.

8. A method as claimed in claim 1 including a fuel system having an electronic engine controller which is arranged to recognize the change in said parameter and utilizing the pump speed at the time of the parameter change to compute a leakage flow number of the pump during a start-up or run-down sequence of operation of the pump.

9. A method as claimed in claim 1 including a fuel supply system and the additional step of determining the fuel temperature and accommodating variations in fuel temperature in the determination of the pump health.

10. A method as claimed in claim 9 characterized in that fuel temperature is determined by a pre-existing sensor provided for other fuelling purposes.

* * * * *